United States Patent [19]
Bessho et al.

[11] Patent Number: 4,855,703
[45] Date of Patent: Aug. 8, 1989

[54] MULTILAYERED-EDDY-CURRENT TYPE STRONG MAGNETIC FIELD GENERATOR

[75] Inventors: Kazuo Bessho; Sotoshi Yamada, both of Kanazawa, Japan

[73] Assignee: Kanazawa University, Kanazawa, Japan

[21] Appl. No.: 160,295

[22] Filed: Feb. 25, 1988

[30] Foreign Application Priority Data

Mar. 19, 1987 [JP] Japan ................................. 62-62708

[51] Int. Cl.$^4$ ............................................. H01F 3/00
[52] U.S. Cl. .................................... 335/296; 335/299
[58] Field of Search ............... 335/209, 210, 296, 297, 335/299

[56] References Cited

U.S. PATENT DOCUMENTS 2,943,265  6/1960  Kaiser ............................ 335/210 X
3,175,131  3/1965  Burleigh et al. .................... 335/210
3,231,842  1/1966  Brower et al. ................... 335/299 X

FOREIGN PATENT DOCUMENTS 1329084  4/1963  France .
63-84103  4/1988  Japan .
1586796  3/1981  United Kingdom .

OTHER PUBLICATIONS

IEEE Transactions on Magnetics, MAG-20, No. 5, Part 2, Sep. 1984, pp. 1810–1812, New York, "A Small Size 7 Tesla Flux-Concentrator of Modulator Construction Fed by a Small Thyristor Pulse Generator."

Primary Examiner—George Harris
Attorney, Agent, or Firm—Spencer & Frank

[57] ABSTRACT

The disclosed strong magnetic field generator has a number of concentric conductor cylinders, each of which has a longitudinal slit so as to have an open sidewall. Exciting coils are mounted on the cylinders to induce an eddy current in each cylinder in a circumferential direction. A conductor plate with a central hole and a radial slit extending from the central hole to an open end at its periphery is connected to the concentric cylinders while placing the central hole at the center of all the cylinders and while aligning the longitudinal slits of all the cylinders with each other along the radial slit. Thus, the path of eddy current in each cylinder is closed through sidewall portions of the radial slit and the central hole, and the eddy currents of all the cylinders are superposed at the sidewall portion of the central hole for generating a very strong magnetic field there.

2 Claims, 6 Drawing Sheets

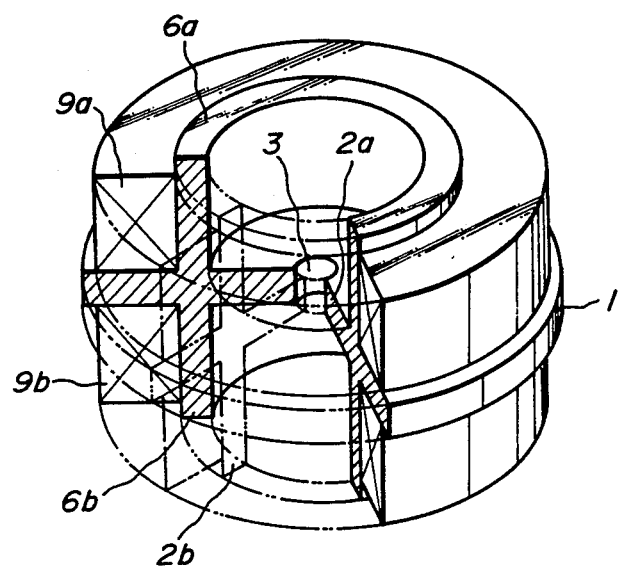
FIG_2
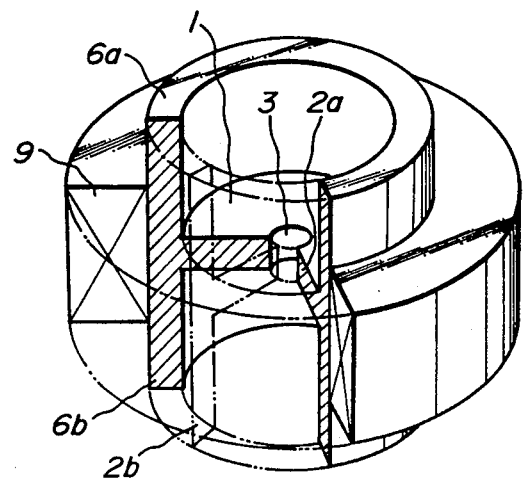
FIG_3

FIG_4
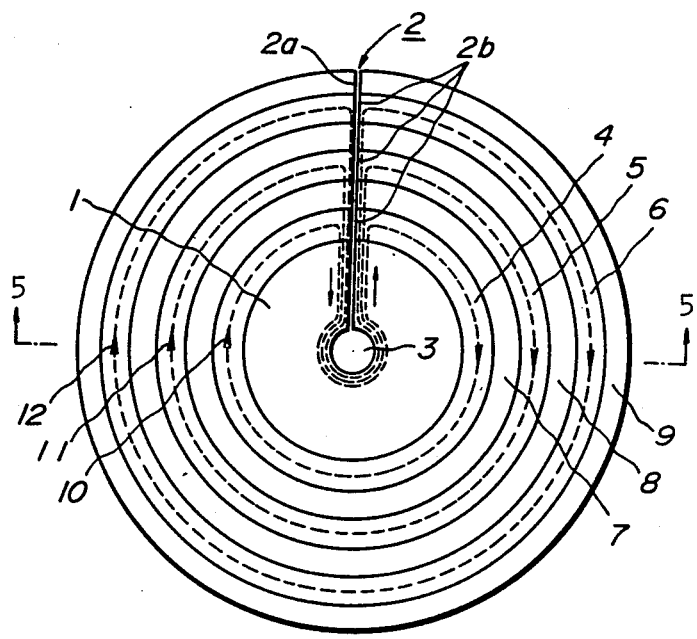
FIG_5
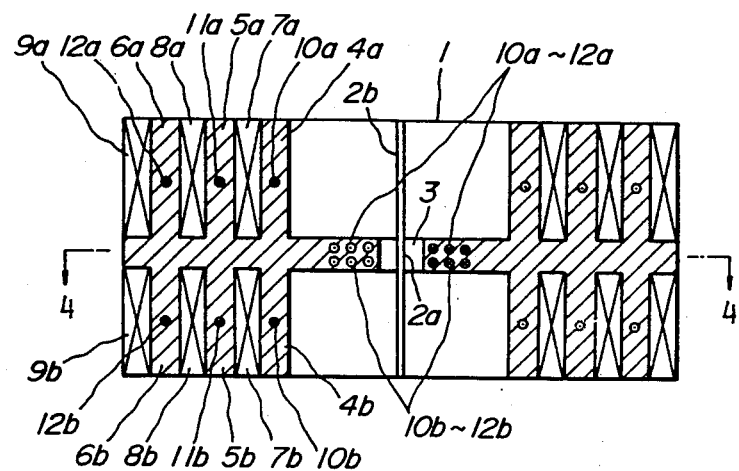

FIG_6
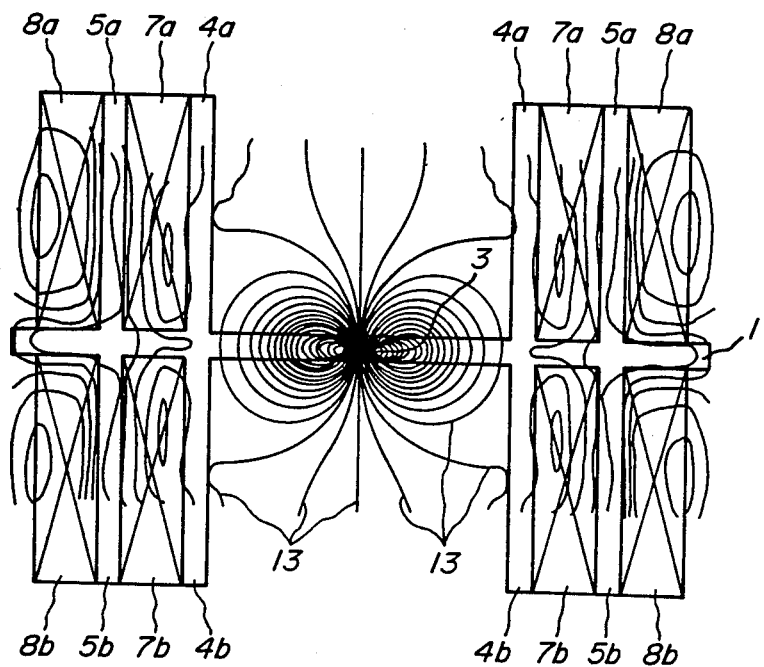

FIG.9 _PRIOR ART_
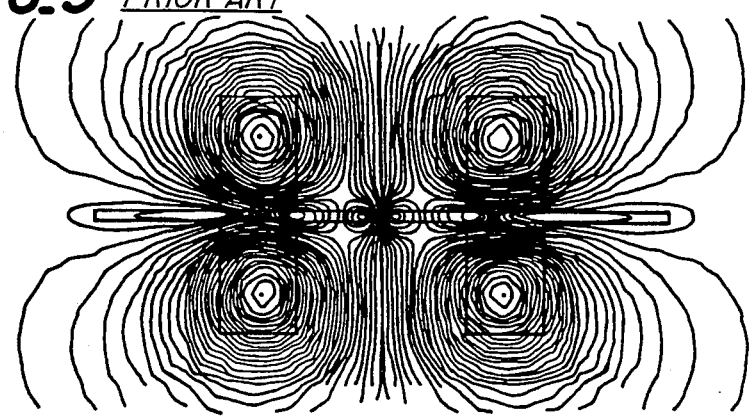
FIG.10 _PRIOR ART_
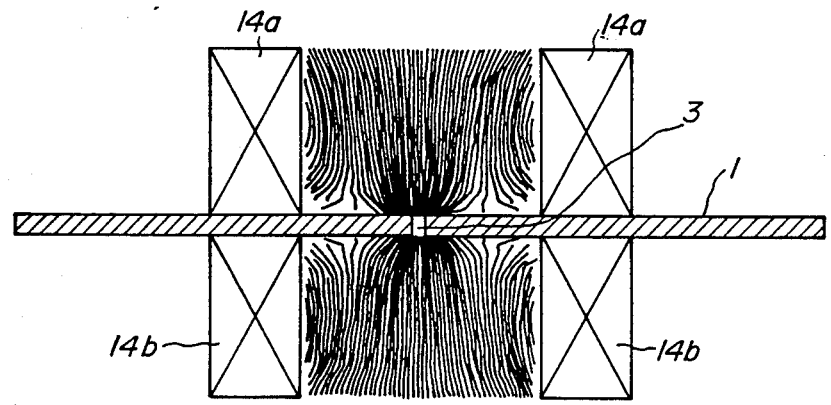
FIG.11 _PRIOR ART_
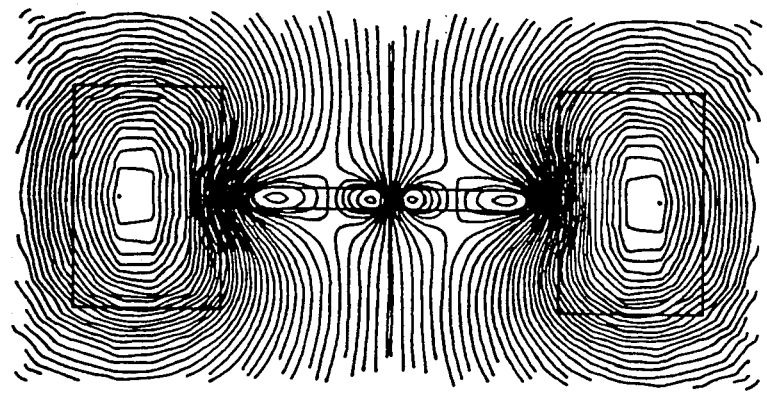

MULTILAYERED-EDDY-CURRENT TYPE STRONG MAGNETIC FIELD GENERATOR

BACKGROUND OF THE INVENTION

1. Field of the Invention

This invention relates to a multilayered-eddy-current type strong magnetic field generator which is suitable for various research works in magnetics engineering such as studies of magnetic properties of materials, in power magnetics, in bio-magnetics, and in nuclear fusion. More particularly, the invention relates to a strong magnetic field generator which can continuously generates a very strong magnetic field by superposition of eddy currents that are individually induced in multiple conductor layers respectively.

2. Related Art Statement

Much efforts are currently undertaken for research and development of strong magnetic field generators by using large-scale experimental facilities, in order to promote investigations and studies of properties of materials in strong magnetic field, preparation and testing of new materials and experiments on nuclear fusion.

Conventional strong magnetic field generators can be classified into several groups; namely, destructive pulse strong magnetic field generators such as those of KNER method and the implosion method, nondestructive pulse strong magnetic field generators such as those of the multilayered coil type and the so-called MIT type, continuous strong magnetic field generators such as those of superconductive type and hybrid type.

The strong magnetic field generators of the prior art provided very strong magnetic fields, but they have shortcomings in that the duration of the strong magnetic fields generated is very short, that special facilities such as extremely low temperature apparatus and large power source apparatus are required, that only pulse or direct-current (DC) magnetic field can be generated, and that continuous generation of strong alternating-current (AC) magnetic field is not possible.

To overcome the above shortcomings of the prior art and to facilitate continuous generation of strong AC magnetic field, the inventors proposed an eddy current type strong AC magnetic field generator in their Japanese Patent Application No. 61(1986)-228,459. More specifically, the eddy current type AC magnetic field generator which was previously proposed by the inventors uses a conductor plate placed in an AC magnetic field to be produced by an electromagnetic formed of a coil, so that an eddy current is induced in the conductor plate for generating a counter magnetic field for neutralizing the AC magnetic field of the electromagnet. A cavity is bored in the conductor plate in such a manner that the AC magnetic field due to the eddy current is converged in the cavity so as to intensify the magnetic flux density to an extremely high level at the cavity. Thereby, a very strong AC magnetic field is generated at the cavity by the converging of the eddy current thereat.

FIG. 7 and FIG. 8 show examples of the previously proposed eddy current type strong AC magnetic field generator. In FIG. 7, two conductor plates 1a and 1b with a minute slit 2 or a cavity therebetween have two coils 14a and 14b mounted on opposite surfaces thereof. When the coils 14a and 14b are excited by applying a suitable AC voltage thereto, AC magnetic flux is converged in the slit 2 due to the above-mentioned reason, and the magnetic flux density in the slit is intensified and a strong AC magnetic field is generated there.

In the example of the eddy current type strong AC magnetic field generator of FIG. 8, a conductor disk 1 with a central hole 3 and a slit 2 in radial direction is disposed within a single coil 14. The slit 2 is in the form of a notch extending from the periphery of the disk 1 to the central hole 3. In this case, the AC magnetic flux is converged at the central hole 3 due to the same reason, and a strong AC magnetic field is generated there.

However, the above eddy current type strong AC magnetic field generator has a shortcoming in that leakage of the magnetic flux to be converged is fairly large. Due to the large leakage, it has been difficult to intensify the density of the AC magnetic flux at the slit 2 or the hole 3 to a theoretical expected level. Thus, the efficiency of AC magnetic field generating has been low, and it cannot operate satisfactorily with a small power source.

More particularly, FIG. 9 shows the distribution of equi-vector-potential lines in the strong AC magnetic field generator of FIG. 7, depicting the manner in which the magnetic flux converges. FIG. 10 shows the magnetic flux distribution in the AC magnetic field generator of FIG. 7, which distribution was checked by experiments. The distributions of the equi-vector-potential lines and the magnetic flux indicate that the structure of FIG. 7 has a large leakage of magnetic flux and the convergence of the AC magnetic flux in the slit 2 is limited to a comparatively low level.

FIG. 11 shows the distribution of equi-vector-potential lines in the strong AC magnetic field generator of FIG. 8, illustrating the manner in which the magnetic flux converges. This figure also indicates a large leakage of magnetic flux as in the preceding example, which means that a high density of AC magnetic flux in the hole 3 is difficult to achieve with the structure of FIG. 8.

SUMMARY OF THE INVENTION

Therefore, an object of the present invention is to solve the above-mentioned shortcomings of the prior art by providing an improved eddy current type strong AC magnetic field generator. With the multilayered-eddy-current type strong magnetic field generator of the invention, a planar conductor having a hole with a slit emanating therefrom is connected to special multilayered paths of eddy currents which paths are coupled to corresponding coils in such a manner that, when the coils are excited by an AC voltage, eddy currents are induced in the multilayered paths and the induced eddy currents are concentrated in the proximity of the hole of the planar conductor, so that AC magnetic flux density at the hole is increased efficiently with a minimum leakage and a strong magnetic field is generated there. The strong AC magnetic field generator of the invention easily provides not only a desired strong AC magnetic field but also a strong pulse magnetic field while using regular conductors at room temperature. Thus, the invention improves the capability of conventional magnetic field generator.

In a strong magnetic field generator according to the invention, a number of conductor cylinders are disposed in a concentric manner, and a longitudinal slit is formed in each of the cylinders so that each cylinder has a sidewall which is open at the slit. An exciting coil surrounds the outside surface of each cylinder so as to induce an eddy current in the cylinder sidewall in its circumferential direction. A conductor plate with a central hole and a radial slit extending from the central hole to the periphery thereof is joined to the conductor cylinders in such a manner that the central hole is at the center of the cylinders while the longitudinal slits of the cylinders intersect with the radial slit of the conductor plate. Accordingly, the path of the eddy current in each conductor cylinder is closed through sidewall portions of both the radial slit and the central hole of the conductor plate, and the eddy currents of all the conductor cylinders are superposed at the central hole of the conductor plate. Thus, the magnetic flux is efficiently converged at the central hole of the conductor plate.

Each of the conductor cylinder of the above-mentioned strong magnetic field generator of the invention may extend in opposite directions of the conductor plate in a symmetrical fashion with respect to the conductor plate.

According to the invention, the magnetic flux due to the eddy currents is efficiently converged with a minimum leakage, and the magnetic flux density is increased to a very high level. Thus, a very strong AC or pulse magnetic field with a desired magnetic flux density is generated, which magnetic field can be used for measurement of physical properties of materials, for research work to develop new materials, for studies in bio magnetics, and the like.

BRIEF DESCRIPTION OF THE DRAWINGS

For a better understanding of the invention, reference is made to the accompanying drawings, in which:

FIG. 2 is a partially cutaway schematic perspective view of a modification of the strong magnetic field of the invention;

FIG. 3 shows another modification of the strong magnetic field generator of the invention in a view similar to FIG. 2;

FIG. 4 is a transverse sectional view taken along the line IV—IV of FIG. 1, showing paths of eddy currents in the strong magnetic field generator;

FIG. 5 is a vertical sectional view taken along the line V—V of FIG. 4, showing the direction of eddy currents therein;

FIG. 6 shows equi-vector-potential lines in the strong magnetic field generator of the invention, showing the manner in which a strong magnetic field is generated in the essential structure of FIG. 1;

FIG. 9 and FIG. 10 show equi-vector-potential lines and magnetic flux distribution in the conventional magnetic field generator of FIG. 7 as illustrations of the manner in which a strong magnetic field is generated therein; and FIG. 11 shows equi-vector-potential lines in the conventional magnetic field generator of FIG. 8 as an illustration of the manner in which a strong magnetic field is generated therein.

Throughout different views of the drawings, the following symbols are used.

1: a conductor plate, 2: a slit, 2a: a radial slit, 2b: a longitudinal slit, 3: a central hole, 4,4a,4b,5a,5b,6a,6b: conductor cylinders, 7,7a,7b,8a,8b,9a,9b,14,14a,14b: exciting coils, 10,10a,10b,11,11a,11b,12,12a,12b: eddy currents, 13: an equi-vector-potential line.

DESCRIPTION OF THE PREFERRED EMBODIMENTS

The invention will be described now in further detail by referring to embodiments.

Figure 1:
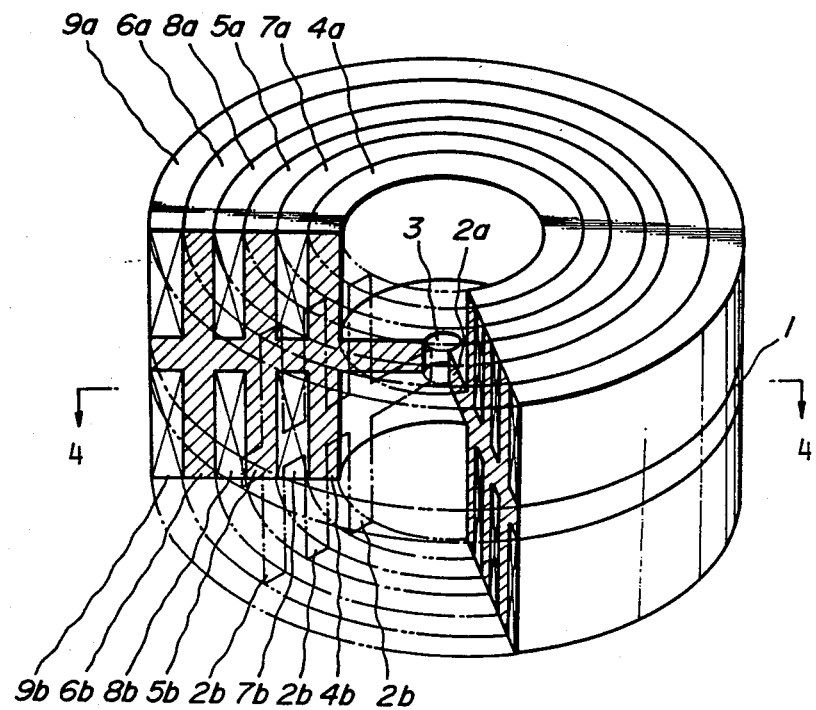
FIG. 1 is a partially cutaway schematic perspective view of the essential structure of a multilayered-eddy-current type strong magnetic field generator according to the invention.

FIG. 1, FIG. 4 and FIG. 5 show an example of the essential structure of the multilayered-eddy-current type strong magnetic field generator according to the invention. A conductor plate 1, preferably formed of a 10 mm thick copper disk, has a central hole 3 at a central portion thereof and a radial slit 2a extending from the central hole 3 to the periphery of the plate 1. The diameter of the hole 3 is for instance about 5 mm. The width of the slit 2a is exaggerated in FIG. 1. A first set of concentric conductor cylinders 4a, 5a, and 6a, e.g., copper cylinders, are mechanically and electrically connected to the top surface of the conductor plate 1 with a center at the central hole 3, preferably at uniform intervals. Each of the cylinders 4a, 5a and 6a has a longitudinal slit 2b, so that the wall of each cylinder is not closed but open at the slit 2b. The longitudinal slits 2b of all the cylinders 4a, 5a and 6a are aligned along the radial slit 2a of the plate 1 as shown in FIG. 4.

A second set of conductor cylinders 4b, 5b and 6b are mechanically and electrically connected to the bottom surface of the conductor plate 1 in such a manner that the second set of conductor cylinders 4b, 5b and 6b are symmetrical with the first set of conductor cylinders 4a, 5a and 6a relative to the conductor plate 1. The cylinders 4b, 5b and 6b also have slits 2b, which slits 2b are aligned with the corresponding slits 2b of the first set of conductor cylinders 4a, 5a and 6a. Thus, the assembly of the conductor plate 1 and the first and second sets of conductor cylinders 4, 5 and 6 have a continuous slit 2 formed of the radial slit a and the longitudinal slits 2b as shown in FIG. 4.

Cylindrical exciting coils 7a, 8a and 9a are mounted on the outside surface of the conductor cylinders 4a, 5a and 6a, respectively. Similarly, cylindrical exciting coils 7b, 8b and 9b are mounted on the outside surface of the conductor cylinders 4b, 5b and 6b, respectively.

In operation, when an AC voltage is applied to the exciting coils 7a, 7b, 8a, 8b, 9a and 9b, eddy currents 10a, 10b, 11a, 11b, 12a and 12b are induced in the corresponding conductor cylinders 4a, 4b, 5a, 5b, 6a and 6b in the circumferential direction thereof respectively as shown in FIG. 4 and FIG. 5. In FIG. 4, the conductor cylinders are collectively denoted by numerals 4, 5 and 6, and the eddy currents are also collectively denoted by numerals 10, 11 and 12.

The paths of such eddy currents 10, 11 and 12 are not completed in the corresponding conductor cylinders due to the presence of the longitudinal slits 2b therein. Instead, the path of the eddy current 10, 11 or 12 in each of the above conductor cylinders is closed by the "sidewall portions" of the radial slit 2a and the central hole 3 of the conductor plate 1 as shown in FIG. 4. What is meant by the sidewall portions here are the sidewalls and conductive areas in their vicinity; namely, the sidewall portion of the radial slit 2a cover both the opposite sidewalls of the slit 2a and conductive areas along the opposite edges of the slit 2a, and the sidewall portion of the central hole 3 covers both the sidewall of the central hole 3a and the conductive area along the circumference of the central hole 3.

Consequently, eddy currents 10, 11 and 12 are all superposed or converged in the sidewall portion of the central hole 3 of the conductor plate 1. In other words, those eddy currents which are induced in the conductor cylinders disposed in a multilayered fashion are accumulated at the circumference of the central hole 3. Thus, the entire magnetic flux due to such eddy currents pass through the inside of the central hole 3. As a result, the magnetic flux density in the hole 3 is greatly increased, and desired strong AC magnetic field can be generated in the hole 3.

FIG. 6 shows the distribution of equi-vector-potential lines 13 in the strong magnetic field generator of FIG. 1, which lines illustrate how the AC magnetic flux due to the eddy currents are converged by the accumulation of the eddy currents at the central hole 3. In FIG. 6, the conductor cylinders 6 and the corresponding exciting coils 9 are not shown for simplicity. As compared with the equi-vector-potential line diagrams of the conventional magnetic field generators as shown in FIG. 9 and FIG. 11, FIG. 6 shows that the equi-vector-potential lines 13 in the magnetic field generator of the invention have a much more intensified density at the central hole 3. Thus, it is evident that the magnetic flux leakage is drastically reduced in the strong magnetic field generator of the invention. In short, FIG. 6 indicates that an extremely strong magnetic field is generated at the central hole 3.

Figure 7:
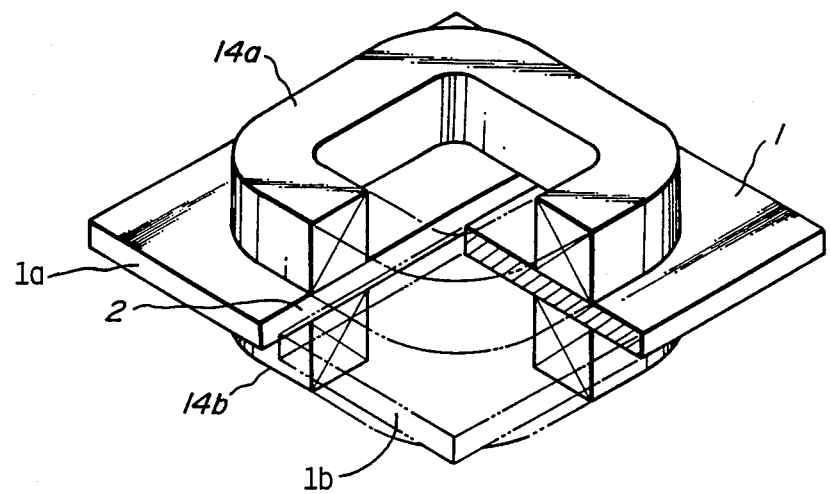
FIG. 7 and FIG. 8 are schematic perspective views of conventional eddy current type strong magnetic field generators, respectively.
Figure 8:
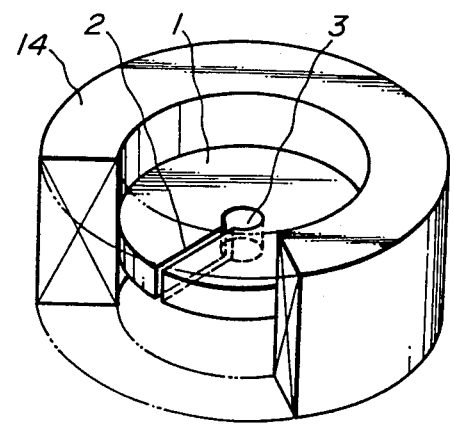

In the embodiment of FIG. 1, the conductor plate 1 is of disk shape and the cross section of the conductor cylinders 4, 5 and 6 are circular, but the conductor plate, the conductor cylinders and the exciting coils can be square or polygonal as in the case of the conventional magnetic field generators as shown for instance in FIG. 7. The conductor cylinders and the exciting coils of FIG. 1 have the same height and they are disposed at uniform intervals, but it is also possible to change their height successively in such a manner that the converged density of the AC magnetic flux be further increased.

FIG. 2 shows a modification in which exciting coils 9a, 9b for the outermost conductor cylinders 6a, 6b are reduced in height but increased in the thickness so as to further reduce the leakage of the magnetic flux for further intensifying the density of the converged AC magnetic flux. For simplicity, other conductor cylinders, such as 4a, 4b, 5a and 5b, are not shown in FIG. 2.

FIG. 3 illustrates another embodiment which uses a common exciting coil 9 for the two outermost conductor cylinders 6a, 6b. In this figure, other conductor cylinders, such as 4a, 4b, 5a and 5b, are not shown for simplicity.

In the foregoing description of the formation and operation of the invention, only continuous generation of strong AC magnetic field has been referred to. It is also possible to generate a strong pulse magnetic field for instance by applying only every other half cycle of the same polarity of an AC voltage to the exciting coils, either intermittently or continuously.

As described in detail in the foregoing, with the present invention, a plurality of conductor cylinders are excited by corresponding coils so as to induce eddy currents therein and the induced eddy currents are converged at the central hole of a planar conductor plate, so that difficulties experienced in the eddy current type magnetic field generator of the prior art, such as large leakage of flux and insufficient strength of the resultant magnetic field, are successfully solved. Thus, the invention has accomplished an outstanding effect in that a strong magnetic field of desired intensity in a very high flux density range can be generated easily and efficiently.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A multilayered-eddy-current type strong magnetic field generator, comprising a conductor plate having a central hole and a radial slit extending from the central hole to peripheral edge of the plate so as to open at the edge, a plurality of conductor cylinders joined to said plate in a concentric manner around the central hole, each of said cylinders having a longitudinal slit aligned with the radial slit of the plate in such a manner that wall of each cylinder opens at the longitudinal slit, and a plurality of exciting coils wound along outer surface of corresponding cylinder in such manner that each exciting coil induces an eddy current in the corresponding cylinder in a circumferential direction thereof, whereby path of the eddy current in each cylinder is closed through sidewall portions of both the radial slit and the central hole of the plate, and the eddy currents in all the cylinders are superposed at the sidewall portion of the central hole so as to generate a very strong magnetic field at the central hole.

2. A multilayered-eddy-current type strong magnetic field generator as set forth in claim 1, wherein each of the conductor cylinders extends in opposite directions of the conductor plate in a symmetrical fashion with respect to the conductor plate.

* * * * *